US009778702B2

(12) United States Patent
Song et al.

(10) Patent No.: US 9,778,702 B2
(45) Date of Patent: Oct. 3, 2017

(54) PROTECTIVE COVER FOR A DEVICE (71) Applicant: HEWLETT-PACKARD DEVELOPMENT COMPANY, L.P., Houston, TX (US)

(72) Inventors: Ki-Bok Song, Houston, TX (US); Eric Chen, Houston, TX (US); Wen-Yo Lu, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/031,619

(22) PCT Filed: Feb. 27, 2014

(86) PCT No.: PCT/US2014/019075
§ 371 (c)(1),
(2) Date: Apr. 22, 2016

(87) PCT Pub. No.: WO2015/130293
PCT Pub. Date: Sep. 3, 2015

(65) Prior Publication Data
US 2016/0357224 A1 Dec. 8, 2016

(51) Int. Cl.
G06F 1/16 (2006.01)
(52) U.S. Cl.
CPC .......... *G06F 1/1669* (2013.01); *G06F 1/1626* (2013.01); *G06F 1/1628* (2013.01); *G06F 1/1632* (2013.01); *G06F 1/1667* (2013.01); G06F 2200/1633 (2013.01)

(58) Field of Classification Search
CPC .... G06F 1/1626; G06F 1/1628; G06F 1/1632; G06F 1/1667
See application file for complete search history.

(56) References Cited

U.S. PATENT DOCUMENTS

| 8,328,008 | B2* | 12/2012 | Diebel | A45C 11/00 206/305 |
| 8,344,836 | B2* | 1/2013 | Lauder | H01F 7/04 206/320 |
| 8,467,186 | B2 | 6/2013 | Zeliff et al. | |
| 8,472,168 | B2* | 6/2013 | Su | G06F 1/1626 361/679.01 |
| 8,746,449 | B2* | 6/2014 | Gallagher | F16M 11/105 206/320 |

(Continued)

FOREIGN PATENT DOCUMENTS

TW 525798 3/2003
TW M430800 6/2012
(Continued)

OTHER PUBLICATIONS

"FabricSkin Keyboard Folio for iPad"; Jul. 24, 2013; 2 pages.
(Continued)

Primary Examiner — Anthony Q Edwards
(74) Attorney, Agent, or Firm — HP Patent Department (57) ABSTRACT Examples disclosed herein provide a protective cover for a portable computing device. The protective cover can include a case for enclosing a back surface and sidewalls of the device. The case can include an opening for exposing a portion of the device comprising a portion of a first sidewall and a portion of the back surface adjacent to the first sidewall.

13 Claims, 7 Drawing Sheets

(56) References Cited

U.S. PATENT DOCUMENTS

| | | | |
|---|---|---|---|
| 9,215,303 B2* | 12/2015 | Nyholm | A45C 11/00 |
| D750,632 S* | 3/2016 | Diebel | D14/440 |
| D752,593 S* | 3/2016 | Diebel | G06F 1/1628 |
| | | | D14/440 |
| 9,451,822 B2* | 9/2016 | Gu | A47B 23/044 |
| 2005/0258021 A1* | 11/2005 | Liu | G06F 3/0221 |
| | | | 200/5 A |
| 2006/0007645 A1 | 1/2006 | Chen et al. | |
| 2012/0043234 A1* | 2/2012 | Westrup | A45C 3/02 |
| | | | 206/320 |
| 2012/0194448 A1 | 8/2012 | Rothkopf | |
| 2012/0212900 A1* | 8/2012 | Hung | G06F 1/1632 |
| | | | 361/679.41 |
| 2012/0268891 A1 | 10/2012 | Cencioni | |
| 2012/0281356 A1* | 11/2012 | Brewer | A45C 11/00 |
| | | | 361/679.55 |
| 2013/0088431 A1 | 4/2013 | Ballagas et al. | |
| 2013/0134061 A1* | 5/2013 | Wu | G06F 1/1626 |
| | | | 206/320 |
| 2013/0270980 A1* | 10/2013 | Hsu | H05K 5/03 |
| | | | 312/223.1 |
| 2013/0271373 A1* | 10/2013 | Milhe | G06F 1/1671 |
| | | | 345/168 |
| 2013/0313142 A1* | 11/2013 | Wen | A45C 11/00 |
| | | | 206/320 |
| 2014/0071654 A1* | 3/2014 | Chien | H01H 13/704 |
| | | | 362/23.03 |
| 2014/0131251 A1* | 5/2014 | Westrup | A45C 11/00 |
| | | | 206/756 |
| 2014/0131538 A1* | 5/2014 | Marshall | F16M 11/10 |
| | | | 248/316.1 |
| 2014/0153182 A1* | 6/2014 | North | G06F 1/1632 |
| | | | 361/679.41 |
| 2014/0211393 A1* | 7/2014 | Lee | G06F 1/1626 |
| | | | 361/679.12 |
| 2015/0041341 A1* | 2/2015 | Marshall | A45C 11/00 |
| | | | 206/45.2 |
| 2015/0055284 A1* | 2/2015 | Han | G06F 1/1616 |
| | | | 361/679.12 |
| 2015/0122850 A1* | 5/2015 | Quehl | A45C 11/00 |
| | | | 224/191 |
| 2015/0280768 A1* | 10/2015 | Huang | H04B 1/3888 |
| | | | 455/575.8 |

FOREIGN PATENT DOCUMENTS

| | | |
|---|---|---|
| TW | 201246014 A | 11/2012 |
| TW | 201322869 A | 6/2013 |
| TW | 201332422 A | 8/2013 |
| TW | M482773 | 7/2014 |
| TW | I457791 | 10/2014 |
| WO | WO-2012054976 | 5/2012 |
| WO | WO-2012160327 | 11/2012 |
| WO | WO-2013056118 | 4/2013 |

OTHER PUBLICATIONS

"The KeyFolio iPad 2 Case Protects & Converts the Device into a Laptop"; Sep. 20, 2011; 3 pages.

Olivarez-Giles, N.; "Sony's New Xperia Tablet S Features Microsoft Surface-Like Keyboard Cover"; Aug. 29, 2012; 4 pages.

* cited by examiner

PROTECTIVE COVER FOR A DEVICE

BACKGROUND

The emergence and popularity of mobile computing has made portable computing devices, due to their compact design and light weight, a staple in today's marketplace. Tablet computers are examples of portable computing devices that are widely used. Tablet computers generally employ a touchscreen on a display surface of the tablet that may be used for both viewing and input. Users of tablets may interact with the touchscreen via finger or stylus gestures. As an example, an on-screen keyboard may be illustrated on the touchscreen surface for entering characters.

DETAILED DESCRIPTION

As the computing power of portable computing devices such as tablet computers continue to increase, users may desire to expand the use of such devices, for example, from solely employing the touchscreen on the display surface of the tablet computer for both viewing and input. As an example, the tablet computer may be docked to a docking station, which may include various ports (e.g., USB, HDMI, etc.) for expanding the use of the tablet computer. Examples include viewing content from the tablet computer on a secondary monitor connected to a video port of the docking station (e.g., HDMI), and connecting the tablet computer to various peripherals via the ports of the docking station (e.g., keyboard, mouse, etc.).

With regards to a keyboard, there may be instances when users may desire to enter characters via an external, physical keyboard, particularly when creating content or typing for a prolonged period of time (e.g., creating a document spreadsheet, or slides). By providing options in expanding the uses of tablet computers, users of tablet computer may have the flexibility to choose between the portable nature of such devices (e.g., employing the touchscreen on the display surface of the tablet computer for both viewing and input) or the expanded uses that allow users to operate the tablet computer similar to a desktop or notebook computer.

While using a portable computing device such as a tablet computer, it may be desirable to protect the tablet computer via a protective cover. As an example, the protective cover may prevent damage to the tablet computer from accidental drops. The protective cover may be used to cover various portions of the tablet computer, such as the display surface and/or the back surface opposite the display surface. As an example, the protective cover may protect at least the display surface when the tablet computer is not in use. When designing such protective covers, factors that may be considered include at least aesthetics and ease of use. When choosing a protective cover, users may consider the overall appearance of the tablet computer when fitted with the protective cover. With regards to ease of use, users may consider the ease of using the tablet computer while it is fitted to the protective cover. A challenge faced by designers of such protective covers is ensuring an ease in transitioning from the portable use of the tablet computer to expanded uses as described above, all while protecting the tablet computer via the protective cover.

Examples disclosed herein provide a protective cover for a portable computing device such as a tablet computer. The protective cover may allow for users to dock the tablet computer to a docking station while the tablet computer is fitted to the protective cover.

In one example, a protective cover for a portable computing device can include a case for enclosing a back surface and sidewalls of the device. The case can include an opening for exposing a portion of the device comprising a portion of a first sidewall and a portion of the back surface adjacent to the first sidewall.

In another example, a protective cover for a portable computing device can include a case for enclosing a back surface and sidewalls of the device. The case can include an opening for exposing a portion of the device comprising a portion of a first sidewall and a portion of the back surface extending from the first sidewall.

In yet another example, a system can include a portable computing device including a display surface and a back surface opposite the display surface, and a protective cover for the device. The protective cover can include a case for enclosing the back surface and sidewalls of the device. The case can include an opening for exposing a portion of the device comprising a portion of a first sidewall and a portion of the back surface extending from the first sidewall.

Figures 1A, 1B:
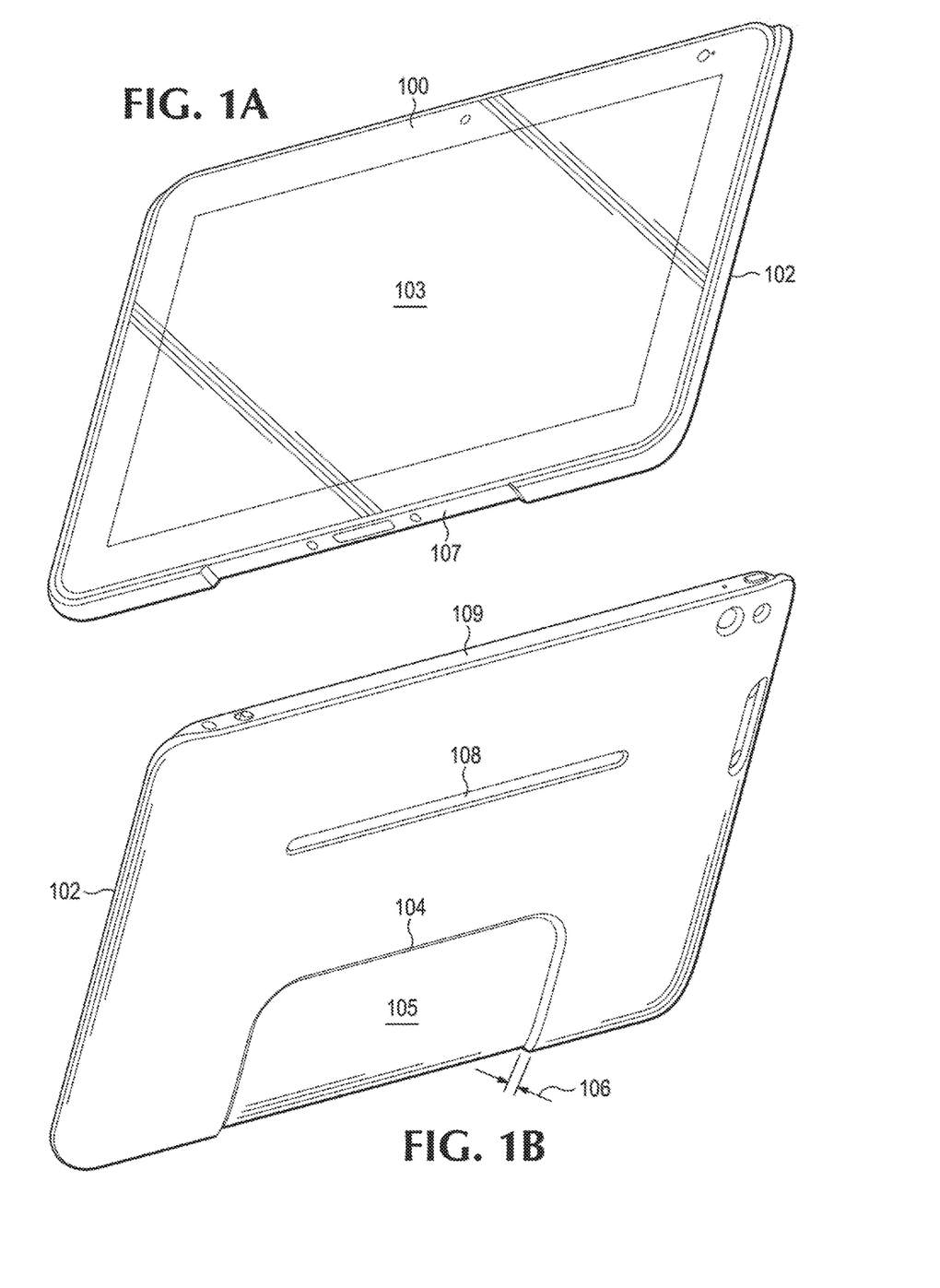
FIGS. 1A-B illustrate a protective cover for a portable computing device, according to an example.

With reference to the figures. FIGS. 1A-B illustrate a protective cover for a portable computing device such as a tablet computer 100 including a display surface 103 and a hack surface 105 opposite the display surface 103, according to an example. The protective surface may include a case 102 for enclosing at least the back surface 105 and sidewalls of the tablet 100. In between the display surface 103 and the back surface 105, the tablet 100 may include sidewalls around a perimeter of the tablet 100. As an example, the tablet 100 may include four sidewalls (e.g., a left sidewall, a right sidewall, a top sidewall 109, and a bottom sidewall 107). Although a user may be able to view the tablet 100 in a portrait or landscape orientation, the bottom sidewall 7 may refer to the same sidewall of the tablet 100.

Referring to FIGS. 1A-B, the case 102 may enclose at least the left and right sidewalls of the tablet 100, and portions of the bottom sidewall 107. A portion of the bottom sidewall 107 (a first sidewall) may be exposed due to an opening 104 in the case 102. In addition, a portion of the back surface 105 adjacent to the bottom sidewall 107 may be exposed, as illustrated in FIG. 1B. As an example, the exposed portion of the back surface 105 may be continuous and extend from the exposed portion of the bottom sidewall 107. Referring to FIG. 1B, the opening 104 or cutout may be U-shaped, but is not limited to the illustrated shape. As illustrated, a width of the opening 104 for exposing the portion of the tablet 100 (e.g., the portion of the bottom sidewall 107 and the portion of the back surface 105) may be less than a width of the tablet 100. As a result, portions of the bottom sidewall 107 and the back surface 105 adjacent to the exposed portions may be protected by the case 102 of the protective cover. The case 102 may have a thickness 106 that is sufficient to protect the tablet 100, for example, by absorbing any impact from an accidental drop of the tablet 100. In addition, the thickness 106 may be sufficient to protect even the portions of the tablet 100 exposed by the opening 104.

Figure 1C:
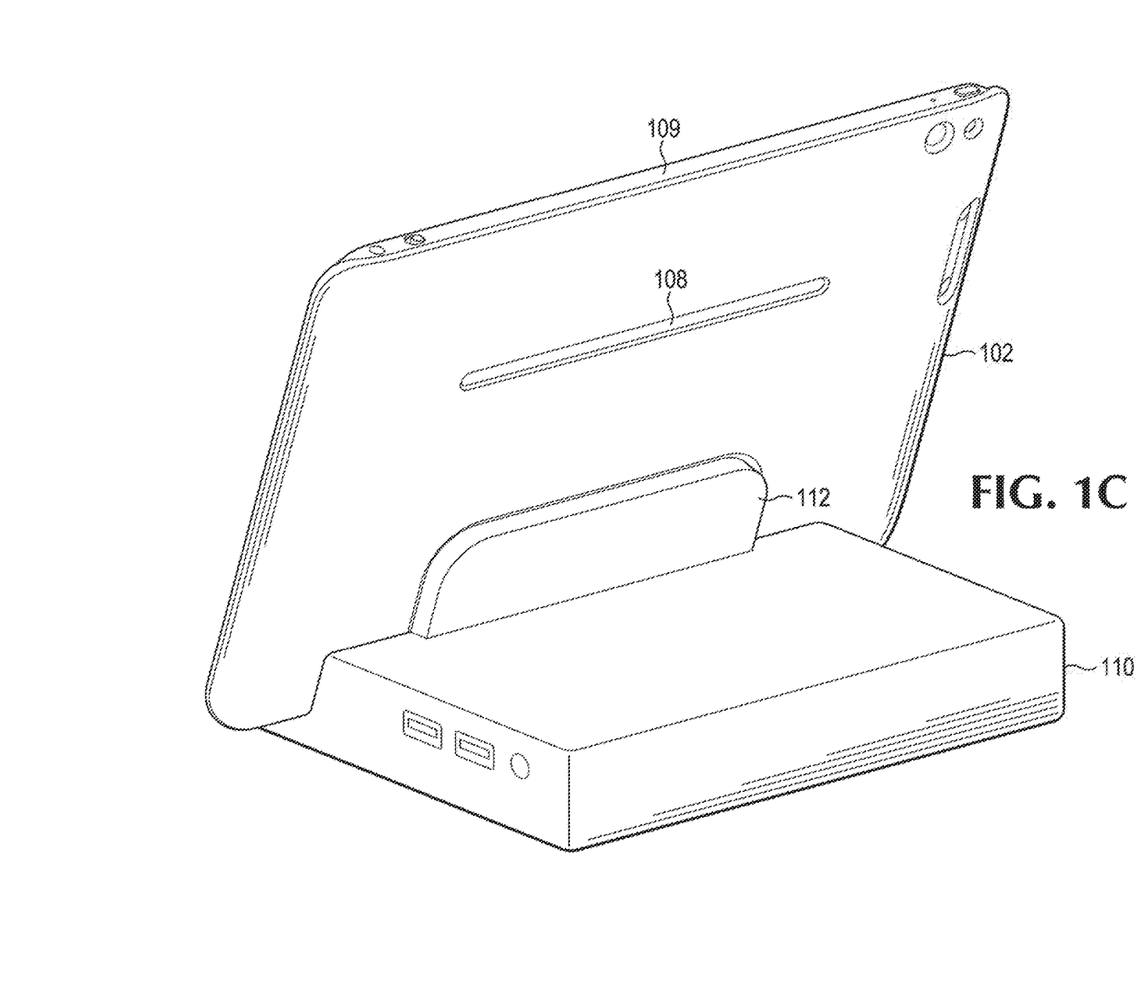
FIG. 1C illustrates the device docked to a docking station, while the device is enclosed by the protective cover, according to an example.

FIG. 1C illustrates the tablet 100 docked to a docking station 110 for the tablet 100, while the tablet is enclosed by a protective cover (e.g., the case 102), according to an example. As described above, the docking station 110 may include various ports (e.g., USB, HDMI, etc.) for expanding the use of the tablet computer 100. The opening 104 in the case 102 may allow for the tablet 100 to be docked to the docking station 110 without having to detach the case 102 from the tablet 100 prior to the docking. The opening 104 may allow for the exposed portion of the back surface 105 to make contact with the docking station. The decking station 110 may include a support element 112 to support the tablet 100 at a viewing angle that is appropriate for users. The support element 112 may make contact with all or a portion of the exposed portion of the back surface 105. As illustrated in FIG. 1C, the support element 112 may occupy the entire portion left exposed via the opening 104, according to an example. With the ability to dock the tablet 100 without having the detach the case 102, users may have a positive experience when transitioning from a portable use of the tablet (e.g., employing the touchscreen on the display surface of the tablet computer for both viewing and input) to an expanded use, for example, via the docking station 110, all while having the tablet 100 protected via a protective cover.

Figures 2, 3:
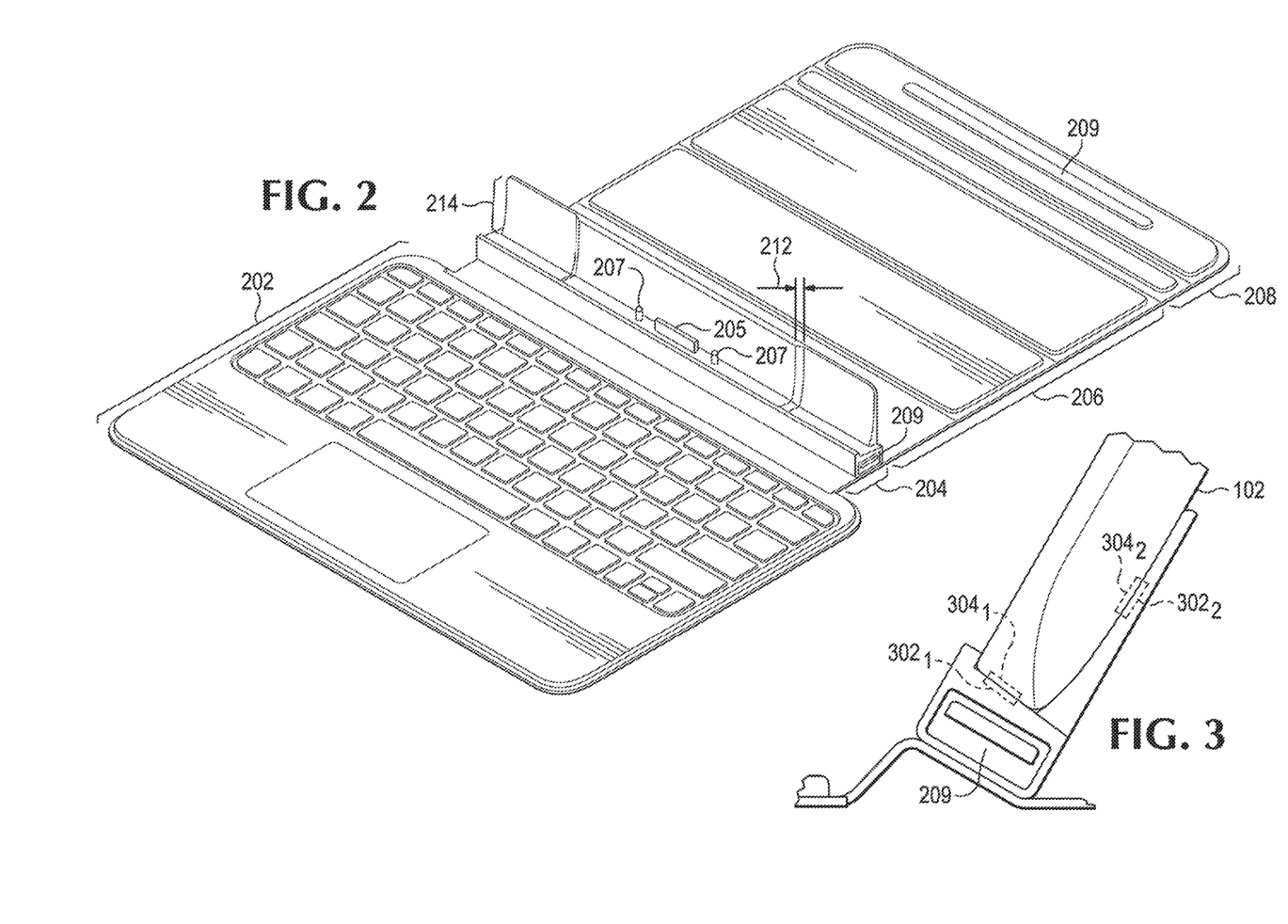
FIG. 2 illustrates a keyboard jacket of the protective cover, according to an example.
FIG. 3 illustrates magnetic members for coupling the device to the keyboard jacket, according to an example.

As an example, in addition to the case 102, the protective cover may include a keyboard jacket, as illustrated in FIG. 2. As described above, there may be instances when users may desire to enter characters via an external, physical keyboard, particularly when creating content or typing for a prolonged period of time (e.g., creating a document, spreadsheet, or slides). Referring to FIG. 1C, an external keyboard may be attached as a peripheral via a port of the docking station 110. Rather than docking the tablet 100 to the docking station 110, the tablet 100 may be docked to the keyboard jacket (refer to FIG. 4A). As an example, the keyboard jacket may also function as a protective cover to protect at least the display surface of the device, as will be further described.

The keyboard jacket of the protective cover includes a first portion 202, which may include peripherals such as a keyboard and/or trackpad (as illustrated). The first portion 202 may be pivotally connected to a second portion 204, which may include a connector 205 and guide pins 207 to electrically couple the peripherals with the tablet 100 when the connector 205 is to connect with a port of the tablet 100 along a first sidewall of the tablet 100. Referring to FIG. 1A, the port and pair of cavities illustrated on the bottom sidewall 107 of the tablet 100 may be used to accommodate the connector 205 and guide pins 207 of the keyboard jacket to electrically couple the peripherals of the keyboard jacket. As an example, the port of the tablet 100 used for docking with the connector 205 may be a common port used for other various purposes, such as for charging the tablet 100.

When docking the tablet 100, fitted with the case 102, to the connector 205, the second portion 204 may include a support element 214 to assist in guiding the tablet 100 to the connector 205. As an example, the portion of the support element 214 aligned with the exposed portion of the back, surface 105 (e.g., via the opening 104) may have a thickness 212 to match the thickness 106 of the case 102. As a result, the portion of the support element 214 having the thickness 212 may make contact with all or a portion of the exposed portion of the back surface 105, similar to the support element 112 of the docking station 110. As an example, the support element 214 may be similarly shaped as the support element 112 (e.g., see FIG. 1C).

In addition to the peripherals, the second portion 204 may include one or more ports 209 to electrically couple with the tablet 100 when the connector 205 is to connect with the port of the tablet 100. The ports 209 may allow for users to further expand the use of the tablet by connecting to various other peripherals (e.g., camera, camcorder, secondary monitor). As an example, the second portion 204 may be composed of a rigid or semi-rigid material in order to provide a level of sturdiness and rigidity while supporting the tablet 100. Examples of materials that may be used for the second portion 204 include, but are not limited to, plastics, fiber glass, carbon fiber composites, and metals.

The first portion 202 and the second portion 204 of the keyboard jacket may be separated from each other by a folding region (e.g., pivotally or flexibly attached). In this way, the portions 202, 204 may be folded with respect to each other at the folding region, which may be composed of a foldable or pliable material. Similarly, the second portion 204 may be pivotally connected to a third portion 206 of the keyboard jacket, and the third portion 206 may be pivotally connected to a fourth portion 208 of the keyboard jacket. As an example, the fourth portion 208 of the keyboard jacket may be coupled to a back surface of the case 102 to operate the system in a laptop mode, where the peripherals disposed on the first portion 202 of the keyboard jacket (and other peripherals connected via ports 209) may be used as input for the tablet 100, as will be further described (e.g., see FIGS. 4A-B).

Referring to FIG. 3, the second portion 204 of the keyboard jacket may include one or more magnetic members 302 (e.g., magnetic members $302_1$, $302_2$) to magnetically couple with corresponding magnetic members 304 (e.g., magnetic members $304_1$, $304_2$) disposed within the case 102. As an example, the magnetic coupling may allow for the case 102 to properly align and attach with the second portion 204 when the connector 205 is to connect with the port of the tablet 100. The magnetic member disposed $304_1$, $304_2$ within the case 102 and the magnetic members $302_1$, $302_2$ of the second portion 204 may be arranged to produce magnetic fields that cooperate with each other to generate a magnetic attractive force that attaches the tablet 100 (fitted within the case 102) and the second portion 204 together in a mating engagement. The magnetic members 302, 304 may be arranged in various locations. For example, magnetic member $302_2$ may be disposed within the support element 214 of the second portion 204, as illustrated. Properties of the magnetic members that may be controlled include, but are not limited to, field strength and magnetic polarity.

With regards to magnetic polarity, magnetic elements having the same polarity (e.g., N-N or S-S) may generate a negative or repulsive magnetic force, whereas those corresponding magnetic elements having opposite polarities (e.g., N-S) will generate a positive or attractive magnetic force. As an example, a north pole of the magnetic members 302 of the second portion 204 of the keyboard jacket may generate a positive or attractive magnetic force with a south pole of the magnetic members 304 disposed within the case 102, as illustrated in FIG. 3. This positive or attractive magnetic force may be generated when the case 102 is placed within proximity of the second portion 204. In addition, controlling the magnetic polarity of the magnetic member 302, 304 may allow for the tablet 100 to attach to the second portion 204 in a specific orientation. For example, any attempt made to attach the tablet 100 (fitted in the case 102) to the second portion 204 in a reverse orientation may generate a repulsive magnetic force rather than an attractive magnetic force.

When detaching the case 102 from the keyboard jacket, the releasing force required to overcome this attractive magnetic force may be determined by controlling properties of one or more of the magnetic members 302, 304, such as the field strength. As mentioned above, the magnetic members 302, 304 may assure proper alignment and positioning of the case 102 with respect to the keyboard jacket. As a result, users may attach the tablet 100 fitted with the case 102 to the second portion 204 of the keyboard jacket in a desired and repeatable manner, such that they are consistently in a pre-determined position relative to one another.

Figure 4A:
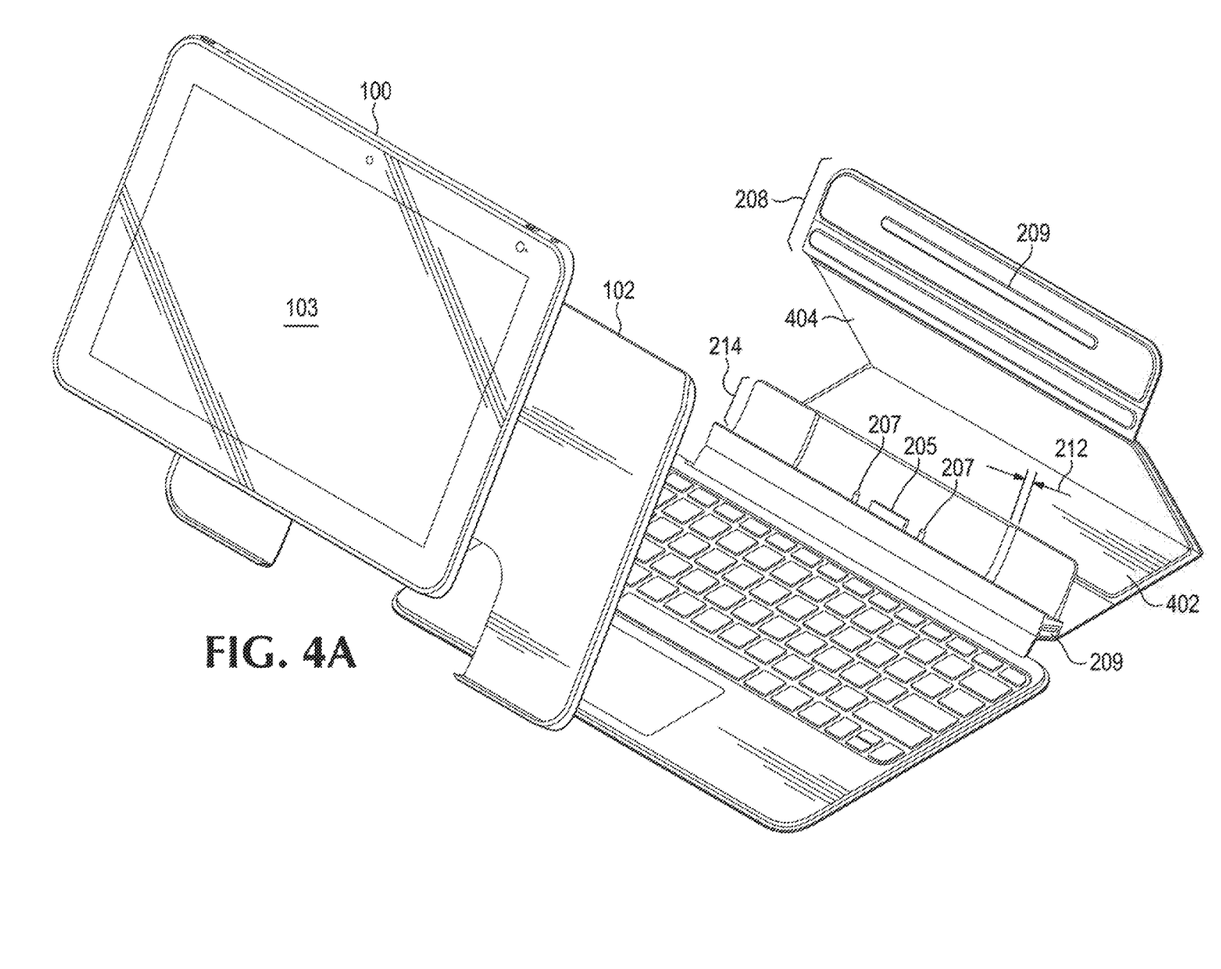
FIGS. 4A-B illustrate the coupling of the device and the protective cover to operate in a laptop mode, according to an example.
Figure 4B:
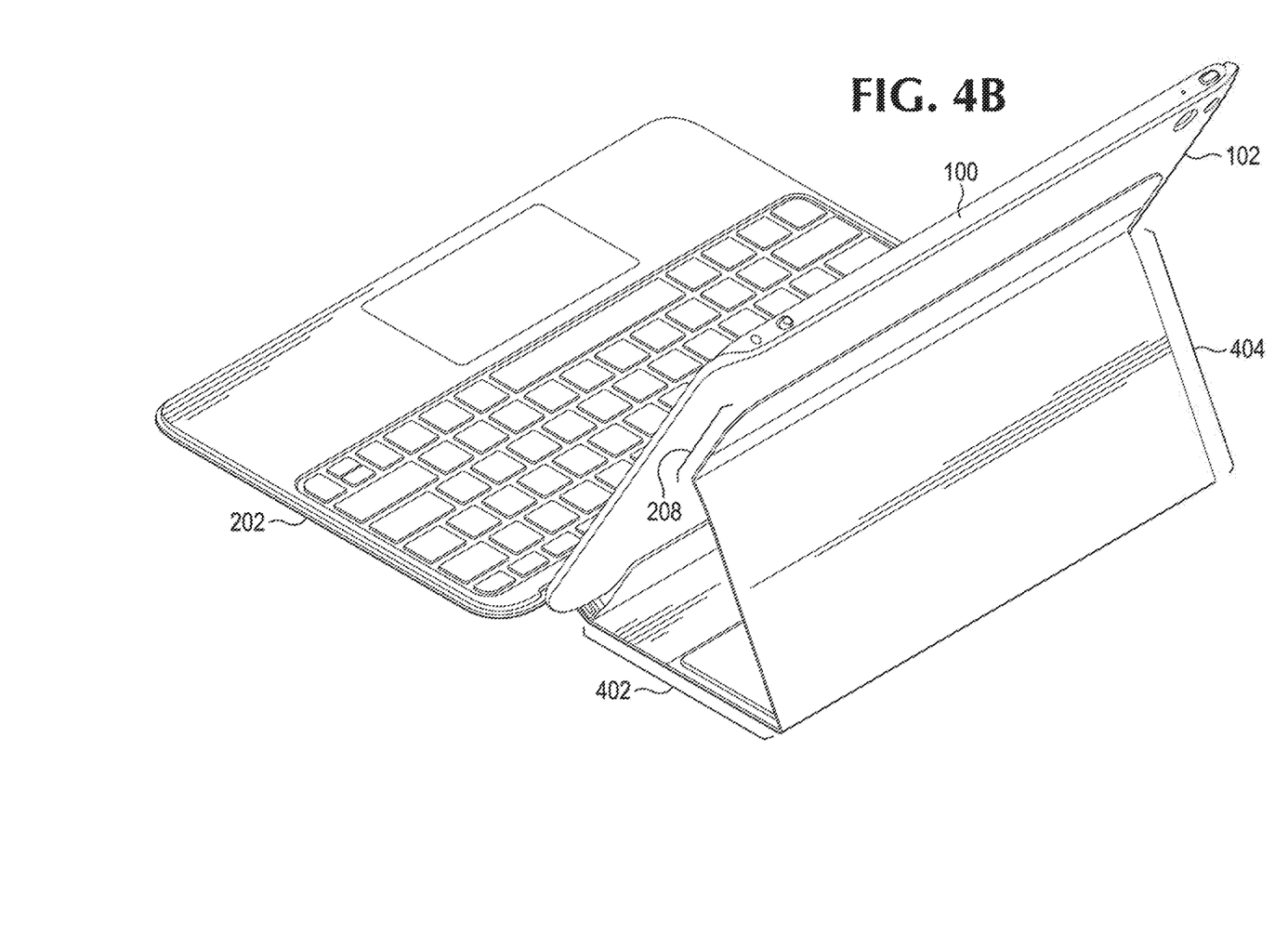

FIGS. 4A-B illustrate the coupling of the tablet 100 and the protective cover (including the case 102 and the keyboard jacket) to operate in a laptop mode, according to an example. The tablet 100 may be fitted to the case 102 as described above (e.g., the case 102 may enclose at least the left and right sidewalls of the tablet 100, and portions of the bottom sidewall 107). Thereafter, the tablet 100, fitted to the case 102, may connect to the connector 205 to power the peripherals disposed on the first portion 202 and ports 209 of the keyboard jacket. As described above with reference to FIG. 3, the magnetic coupling may allow for the tablet 100 to properly align and attach with the second portion 204 when the connector 205 is to connect with the port of the tablet 100.

In order to support the display surface 103 of the tablet 100 at a viewing angle that is appropriate for users (e.g., laptop mode), the fourth portion 208 of the keyboard jacket may be coupled to the back surface of the case 102, as illustrated in FIG. 4B. In order for the fourth portion 208 to be coupled to the back surface of the case 102, the third portion 206 of the keyboard jacket may include a first section 402 and a second section 404 separated from each other by a folding region (e.g., pivotally or flexibly attached). In this way, the sections 402, 404 may be folded with respect to each other at the folding region, which may be composed of a foldable or pliable material. As an example, the sections 402, 404 may be composed of a rigid or semi-rigid material in order to provide a level of sturdiness and rigidity while supporting the tablet 100 in laptop mode, as illustrated in FIG. 4B. Examples of materials that may be used for the sections 402, 404 include, but are not limited to, plastics, fiber glass, carbon fiber composites, and metals. As an example, the first portion 202 of the keyboard jacket may also be composed of rigid or semi-rigid material in order to provide a level of sturdiness to operate the system illustrated in FIG. 4B on various surfaces (e.g., on a user's lap or a level surface, such as a desk or table).

As an example, the fourth portion 208 of the keyboard jacket may be magnetically coupled to the back surface of the case 102. The case 102 may include magnetic member 108 (e.g., see FIG. 1B), and the fourth portion 208 may include a magnetic member 209 to magnetically couple with magnetic member 108 when the fourth portion 208 is placed within proximity of the back surface of the case 102, as described above with regards to magnetic coupling. The magnetic members 108, 209 may assure proper positioning of the fourth portion 208 with respect to the beck surface the case 102. As a result, users may couple the keyboard jacket to the back surface of the case 102 in a desired and repeatable manner, such that they are consistently in a pre-determined position relative to one another. Magnetically coupling the case 102 to the keyboard jacket (via the fourth portion 208) may provide an appearance of oneness by in which the case 102 and the keyboard jacket can appear as a single, unified protective cover, providing uniformity in appearance.

Although FIG. 1B illustrates the magnetic member 108 disposed on an exterior surface of the case 102, the arrangement of the magnetic member 108 is not limited to what is illustrated. For example, the back surface of the case 102 may be formed of a non-magnetic material, such as a plastic or non-ferrous metal (e.g., aluminum) and the case 102 may include the magnetic member 108 disposed with the case 102, configured to work through the back surface of the case 102. By using magnetic members 108 disposed within the case 102, the back surface of the case 102 may have a smooth finish, contributing to the overall aesthetic appeal of the protective cover. As an example, the case 102 may have multiple rows of the magnetic member 108, allowing a user to adjust the viewing angle of the display surface 103 by choosing an appropriate row of the magnetic member 108 when coupling to the fourth portion 208 of the keyboard jacket to the back surface of the case 102.

Figure 4C:
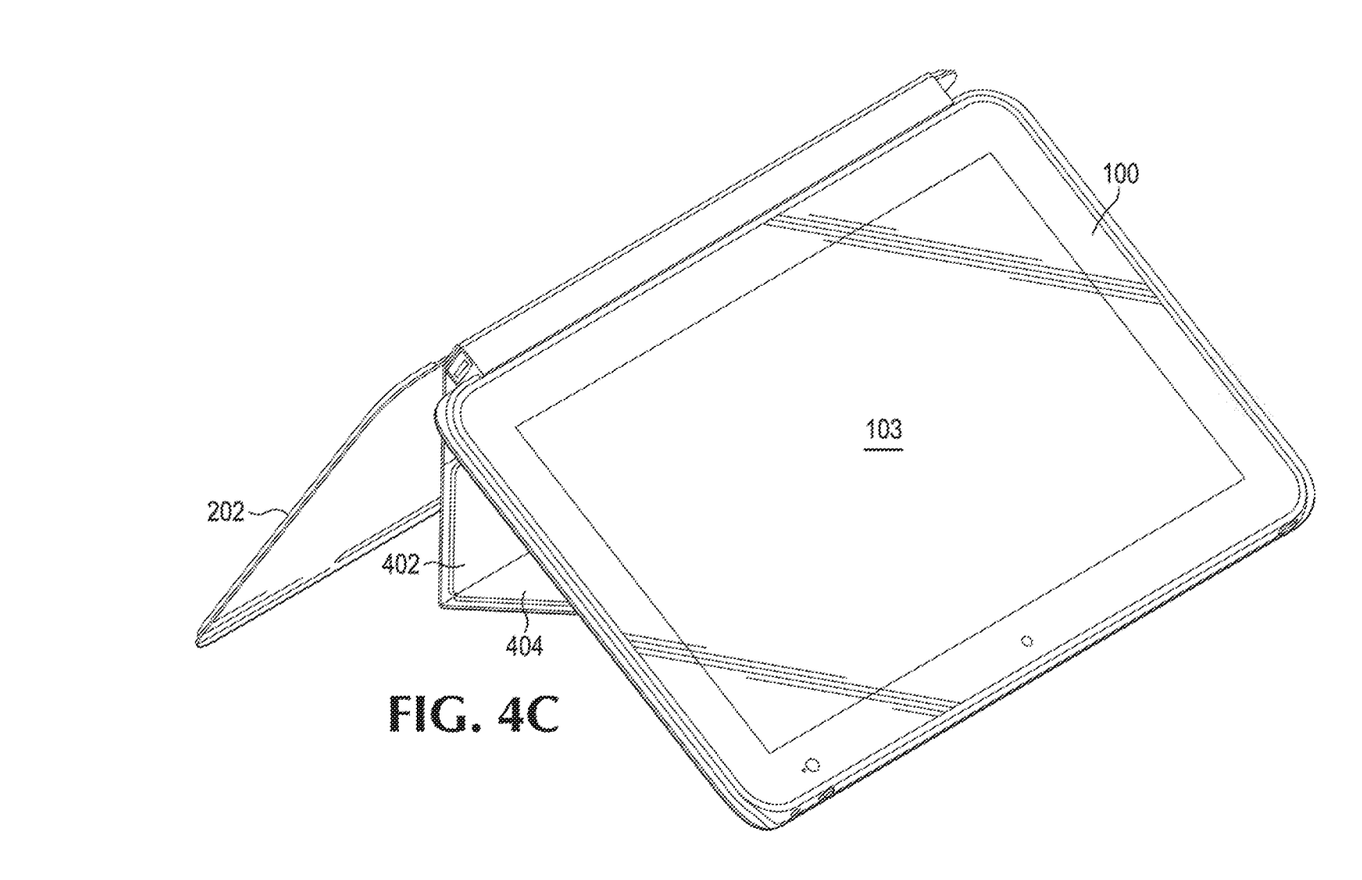
FIG. 4C illustrates the use of the protective cover to operate the device in another mode, according to an example.

The protective cover may allow for users to operate the tablet 100 in various modes. Referring to FIG. 4C, the protective cover may allow for users to operate the tablet 100 in a tent mode, according to an example. As an example, the first portion 202 of the keyboard jacket may be folded back at the folding region between the first portion 202 and the second portion 204, such that a base of the first portion 202 may rest on a surface (e.g., a level surface, such as a desk or table), as illustrated. In addition, the folding region between the first section 402 and the second section 404 may rest on the surface in order to support the display surface 103 of the tablet 100 at a viewing angle in the tent mode. As an example, the first portion 202 and the sections 402, 404 may be composed of a rigid or semi-rigid material in order to provide a level of sturdiness and rigidity while supporting the tablet 100 in tent mode (described above).

Figure 5:
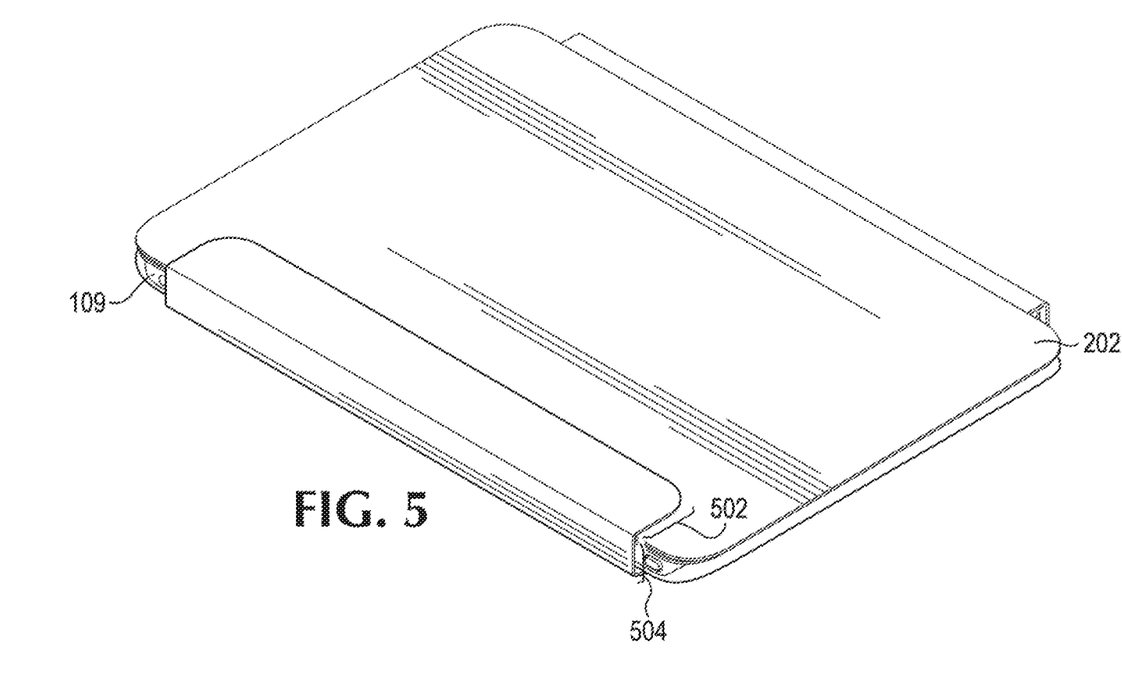
FIG. 5 illustrates the use of the protective cover to protect the device when it is not in use, according to an example.

Referring to FIG. 5, the protective cover, including the case 102 and the keyboard jacket, may be used to protect the tablet 100 when it is not in use. From the laptop mode illustrated in FIG. 4B, upon applying a sufficient force to overcome the attractive magnetic force between magnetic members 108, 209, the fourth portion 208 of the keyboard jacket may detach from the back surface of the case 102. The keyboard jacket may be folded at the folding region between the second portion 204 and the third portion 206, such that the third portion may protect the back surface of the case 102. Similarly, the keyboard jacket may be folded at the folding region between the first portion 202 and the second portion 204 such that the first portion 202 may protect the display surface 103 of the tablet 100, as illustrated in FIG. 5.

The fourth portion 208 may wrap around the top sidewall 109 (opposite the bottom sidewall 107) to secure the tablet 100 within the protective cover. The fourth portion 208 may include a first section 502 and a second section 504 separated from each other by a folding region (e.g., pivotally or flexibly attached). In this way, the sections 502, 504 may be folded with respect to each other at the folding region, which may be composed of a foldable or pliable material. Referring to FIG. 5, the second section 504 may wrap around the top sidewall 109, and the first section 502 may include magnetic member 209 to magnetically couple to a magnetic member disposed within the first portion 202 of the keyboard jacket. The magnetic coupling may ensure that the protective cover remains closed to protect the tablet, until a sufficient force is applied to overcome the attractive magnetic force.

It is appreciated that examples described may include various components and features. It is also appreciated that numerous specific details are set forth to provide a thorough understanding of the examples. However, it is appreciated that the examples may be practiced without limitations to those specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A protective cover for a portable computing device including a display surface and a back surface opposite the display surface, the protective cover comprising:
   a case for enclosing the back surface and sidewalls of the device, wherein the case includes an opening for exposing a portion of the device comprising a portion of a first sidewall and a portion of the back surface adjacent to the first sidewall, wherein the portion of the back surface makes contact with a docking station for the device when the device enclosed by the case is docked to the docking station.

2. The protective cover of claim 1, comprising:
   a first portion including a keyboard;
   a second portion pivotally connected to the first portion and including a connector to electrically couple the keyboard with the device when the connector is to connect with a port of the device along the first sidewall of the device;
   a third portion pivotally connected to the second portion; and
   a fourth portion pivotally connected to the third portion and coupled to a back surface of the case to operate the system in a laptop mode.

3. The protective cover of claim 2, wherein the fourth portion is magnetically coupled to the back surface of the case.

4. The protective cover of claim 3, wherein the back surface of the case is formed of non-magnetic material and the case includes magnetic members disposed within the case.

5. The protective cover of claim 4, wherein the fourth portion comprises magnetic members to magnetically couple with the magnetic members disposed within the case when the fourth portion is placed within proximity of the back surface of the case.

6. The protective cover of claim 4, wherein the fourth portion is to magnetically detach from the back surface of the case, such that the third portion is to protect the back surface of the case and the first portion is to protect the display surface of the device, wherein the fourth portion is to wrap around a second sidewall of the device opposite the first sidewall to magnetically couple to a magnetic member disposed within the first portion.

7. The protective cover of claim 2, wherein the second portion comprises magnetic members to magnetically couple with magnetic members disposed within the case to align the device with the second portion when the connector is to connect with the port of the device.

8. The protective cover of claim 2, wherein the second portion comprises one or more ports to electrically couple with the device when the connector is to connect with the port of the device.

9. The protective cover of claim 1, wherein a width of the opening for exposing the portion of the device is less than a width of the device.

10. A protective cover for a portable computing device including a display surface and a back surface opposite the display surface, the protective cover comprising:
    a case for enclosing the back surface and sidewalls of the device, wherein the case includes an opening for exposing a portion of the device comprising a portion of a first sidewall and a portion of the back surface extending from the first sidewall;
    a first portion including a keyboard;
    a second portion pivotally connected to the first portion and including a connector to electrically couple the keyboard with the device when the connector is to connect with a port of the device along the first sidewall of the device, wherein the portion of the back surface makes contact with a support element of the second portion when the device enclosed by the case is docked to the connector;
    a third portion pivotally connected to the second portion; and
    a fourth portion pivotally connected to the third portion and coupled to a back surface of the case to operate the system in a laptop mode.

11. The protective cover of claim 10, wherein a width of the opening for exposing the portion of the device is less than a width of the device.

12. A system, comprising:
    a portable computing device including a display surface and a back surface opposite the display surface; and
    a protective cover for the device, comprising:
       a case for enclosing the back surface and sidewalls of the device, wherein the case includes an opening for exposing a portion of the device comprising a portion of a first sidewall and a portion of the back surface extending from the first sidewall, wherein the portion of the back surface makes contact with a docking station for the device when the device enclosed by the case is docked to the docking station.

13. The system of claim 12, wherein the protective cover comprises:
    a first portion including a keyboard;
    a second portion pivotally connected to the first portion and including a connector to electrically couple the keyboard with the device when the connector is to connect with a port of the device along the first sidewall of the device;

a third portion pivotally connected to the second portion; and a fourth portion pivotally connected to the third portion and coupled to a back surface of the case to operate the system in a laptop mode.

\* \* \* \* \*